US011727783B2

(12) United States Patent
Bang et al.

(10) Patent No.: US 11,727,783 B2
(45) Date of Patent: Aug. 15, 2023

(54) METHOD AND ELECTRIC VEHICLE WITH CO2 WARNING SYSTEM, AND USE OF A SENSOR SYSTEM THEREFORE

(71) Applicant: BLUE WORLD TECHNOLOGIES HOLDING APS, Aalborg Ost (DK)

(72) Inventors: Mads Bang, Stovring (DK); Anders Risum Korsgaard, Aalborg (DK); Mads Friis Jensen, Aalborg (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/793,761

(22) PCT Filed: Jan. 12, 2021

(86) PCT No.: PCT/DK2021/050011
§ 371 (c)(1),
(2) Date: Jul. 19, 2022

(87) PCT Pub. No.: WO2021/148093
PCT Pub. Date: Jul. 29, 2021

(65) Prior Publication Data
US 2023/0068200 A1    Mar. 2, 2023

(30) Foreign Application Priority Data

Jan. 20, 2020 (DK) .......................... PA 2020 00065

(51) Int. Cl.
*G08B 21/14* (2006.01)
*G07C 5/00* (2006.01)
(Continued)

(52) U.S. Cl.
CPC ............. *G08B 21/14* (2013.01); *G07C 5/008* (2013.01); *G08B 21/18* (2013.01); *B60L 50/75* (2019.02)

(58) Field of Classification Search
CPC ........ G08B 21/14; G08B 21/18; G07C 5/008; B60L 50/75
(Continued)

(56) References Cited

U.S. PATENT DOCUMENTS 6,158,537 A   12/2000   Nonobe
9,196,146 B1  11/2015   Vicente
(Continued)

FOREIGN PATENT DOCUMENTS

DE    4014499 C2   10/1992
DE    4216232 A1   11/1993
(Continued)

OTHER PUBLICATIONS

International Search Report for PCT/DK2021/050011, Prepared by the Nordic Patent Institute, dated Apr. 6, 2021, 5 pages.

*Primary Examiner* — Jacob S. Scott
*Assistant Examiner* — Michael E Butler
(74) *Attorney, Agent, or Firm* — Brooks Kushman PC; John E. Nemazi

(57) ABSTRACT

A method for increasing safety in the surroundings of an electric vehicle having a fuel cell system and batteries, wherein the vehicle is configured for charging the batteries by power from the fuel cell system and e.g. produces CO2 during this operation, even when the vehicle is turned-off and in a parked situation, wherein the method includes the steps of providing a sensor system having a gas intake and configured for warning against elevated CO2 levels in the surroundings of the vehicle, mounting the sensor system on the vehicle with the gas intake outside the vehicle's cabin, providing an alarm when the sensor system evaluates that the CO2 levels in the surroundings of the vehicle are elevated and surpass a predetermined threshold level.

8 Claims, 1 Drawing Sheet

(51) Int. Cl.
*G08B 21/18* (2006.01)
*B60L 50/75* (2019.01)

(58) Field of Classification Search
USPC .......................................................... 701/33.2
See application file for complete search history.

(56) References Cited

U.S. PATENT DOCUMENTS

| | | | |
|---|---|---|---|
| 9,202,316 B1 | 12/2015 | Trudell | |
| 2004/0017174 A1* | 1/2004 | Bruck | H01M 16/003 320/103 |
| 2011/0074561 A1 | 3/2011 | Mackjust et al. | |
| 2012/0089299 A1 | 4/2012 | Breed | |
| 2013/0201316 A1* | 8/2013 | Binder | H04L 67/12 701/2 |
| 2014/0176325 A1 | 6/2014 | Park et al. | |
| 2015/0073632 A1* | 3/2015 | Hill | H01M 8/083 429/93 |
| 2015/0243151 A1 | 8/2015 | Wright et al. | |
| 2016/0103111 A1* | 4/2016 | Griffin | B60N 2/002 73/25.01 |
| 2018/0367320 A1* | 12/2018 | Montalvo | H04L 12/2803 |
| 2019/0237835 A1 | 8/2019 | Barde et al. | |
| 2019/0359199 A1* | 11/2019 | Yoon | H01M 8/0606 |

FOREIGN PATENT DOCUMENTS

| | | | |
|---|---|---|---|
| EP | 3349999 B1 | 9/2019 | |
| KR | 20130027803 A | 3/2013 | |
| WO | 2017046146 A1 | 3/2017 | |

\* cited by examiner

METHOD AND ELECTRIC VEHICLE WITH CO2 WARNING SYSTEM, AND USE OF A SENSOR SYSTEM THEREFORE

CROSS-REFERENCE TO RELATED APPLICATION

This application is the U.S. national phase of PCT Application No. PCT/DK2021/050011 filed on Jan. 12, 2021, which claims priority to DK Patent Application No. PA 2020 00065 filed on Jan. 20, 2020, the disclosures of which are incorporated in their entirety by reference herein.

FIELD OF THE INVENTION

The invention relates to a $CO_2$ warning system in a method and in an electric vehicle with a fuel cell system for increased safety.

BACKGROUND OF THE INVENTION

Fuel cell systems that use a mix of methanol and water as fuel produce substantial amounts of carbon dioxide, $CO_2$. For producing hydrogen gas, $H_2$, the mix of methanol $CH_3OH$ and water $H_2O$ is catalytically converted into hydrogen gas $H_2$ and $CO_2$. The $CO_2$ passes the fuel cell and is released through the exhaust system into the environment. Although, $CO_2$ in general has caught environmental attention, there is no risk associated with it, as long as it does not fill the cabin of the vehicle.

For providing safety for passengers, US20016/103111 discloses use of $CO_2$ sensors for measuring the $CO_2$ concentration inside the cabin of a car. $CO_2$ sensors as safety measure inside the cabin when using heaters is disclosed in German Patent DE4014499.

Increased levels of carbon dioxide, $CO_2$, has received general attention in environments for humans. A general sensor equipment for a dwelling is disclosed in German patent document DE4216232, such that a window is opened automatically when a threshold is surpassed.

U.S. Pat. No. 9,202,316 describes a hybrid vehicle with a sensor system that comprises a $CO_2$ sensor having a gas intake placed exterior to the vehicle and which is regulating the AC system of the vehicle into recirculation mode for preventing bad air with elevated $CO_2$ levels being sucked into the cabin. This sensor system is only working when a child is detected inside the car and the driver is absent. For a normally parked car, the sensor system is not activated.

Korean patent application KR20130027803A and European patent application EP3349999, equivalent to WO2017046146, disclose $CO_2$ sensors inside the cabin of a vehicle for regulation of the air conditioning in dependence on the $CO_2$ concentration inside the cabin.

As the safety for humans in relation to vehicles has constant attention, there is a steady demand for improvements. It would therefore be desirable to provide an even higher degree of safety in relation to vehicles that are driven by electricity from fuel cells, especially methanol-consuming, fuel-cell-driven vehicles.

DESCRIPTION OF THE INVENTION

It is an objective to provide an improvement in the art. In particular, it is an objective to provide improved safety measures for vehicles that are driven by fuel cell systems with alcohol, optionally methanol, as part of the fuel. These and more objectives are achieved with a system and method as described in the claims and in more detail in the following. In particular, the objective is achieved with a sensor system that has a CO2 warning function for use when the vehicle's fuel cell system is charging the batteries and producing $CO_2$ during the charging process.

When a vehicle that is electrically driven by power from a fuel cell system is parked in a garage or other closed space, it is typically turned off. Therefore, the risk for increased levels of exhaust gas from the fuel cell system is low. However, it has been observed that for vehicles that have a hybrid electrical power system, including a fuel cell system as well as batteries, fuel cells are also producing electricity when the vehicle is parked, namely in the situation when batteries are getting charged with the electric power from fuel cells while the vehicle is parked and not driving. For fuel cell systems that use alcohol, for example methanol, as fuel, substantial amounts of $CO_2$ are produced, which displace the oxygen around the vehicle, and in addition, oxygen is consumed. If then, the vehicle is parked in a closed garage without sufficient ventilation, there is a risk for increased $CO_2$ levels and correspondingly reduced $O_2$ levels.

This is especially so if the ventilation system of the garage is at a height above grounds and there is no air circulation, because the $CO_2$ is heavier than air and may accumulate near the ground. The latter implies that pet animals and children have the highest risk for exposure to increased $CO_2$ levels.

In contrast to vehicles with combustion engines, the charging of the batteries for the fuel cell is quiet, so that no immediate alert is experienced during this process, which would be different if a combustion engine is running and producing exhaust gas, as the noise from the engine would cause attention from the person in the closed space. Also, the smell from the exhaust of the combustion engine would cause an alert of the persons in the space, whereas the released $CO_2$ from the fuel cell system is without smell.

Accordingly, in order to provide an improvement with respect to safety, the fuel cell driven vehicle is provided with a sensor system with at least one of a $CO_2$ sensor and a $O_2$ sensor in order to correspondingly measure at least one of $CO_2$ concentration and $O_2$ concentration in the environment around the vehicle, for example in a garage.

Alternatively, or in addition, the garage itself is provided with a sensor system comprising a $CO_2$ sensor and/or $O_2$ sensor.

However, the embodiment with the vehicle having a $CO_2$ sensor and/or $O_2$ sensor is a more versatile technical solution in that it measures the concentration irrespective of where the vehicle is parked. If the concentration level of $CO_2$ increases above a predetermined $CO_2$ threshold and/or the concentration of $O_2$ decreases below a predetermined $O_2$ threshold, an alarm is given.

In a simple version, the alarm is a sound or light signal that causes attention. In a more advanced technical solution, the alarm implies a wireless signal sent to a remote device, for example a mobile phone, optionally with a corresponding computer application installed on the wireless remote device, where the alarm is given. For example, the alarm may prompt the user to open the garage or stop the fuel cell operation. Optionally, the computer application indicates the $CO_2$ and/or $O_2$ concentration level to the user. As a further indication, the application may prompt the user to stop the operation of the fuel cell of the vehicle by sending a wireless remote command from the application on the remote device to a control unit of the fuel cell system of the vehicle. Optionally, the computer application on the remote device also indicates the charging status of the batteries in order for the user to take a decision as to whether to stop the fuel cells from charging the battery as a measure to prevent passing threshold levels for $CO_2$ and/or $O_2$.

In a practical embodiment, the vehicle comprises a sensor system, which includes a $CO_2$ sensor or an $O_2$ sensor or both, where the sensor system has a gas intake outside the vehicle's cabin in order for the gas intake to have access to the atmosphere in the environment around the vehicle. The sensor system is configured for measuring the $CO_2$ level and/or the $O_2$ level for gas from the gas intake and for correspondingly evaluating the $CO_2$ and/or $O_2$ concentration in gas from the gas intake, for example relatively to a threshold value. The sensor is providing an alarm when the $CO_2$ and/or $O_2$ concentration surpasses a predetermined threshold level.

In practical embodiments, the term "sensor system" includes the gas intake, the sensing mechanism for the gas from the gas intake, the evaluation function of at least one of the $CO_2$ level and the $O_2$ level, as well as a threshold control and alarm generating function. The sensor system may be separated into several components that are not at the exact same location on the vehicle. For example, a visual alarm-giving unit is provided on the outer side of the car, whereas the sensors are within the car and not visible from the outside.

In order to detect critical levels of $CO_2$ near the ground, seeing that $CO_2$ is heavier than air, the gas intake of the $CO_2$ sensor is potentially arranged at a height below 0.7 m or rather below 0.5 m when measured from the ground on which the vehicle is positioned. For a vehicle with wheels, the distance from the sensor to the ground is also the distance from the sensor to the level of the lowest point of the wheels.

As already mentioned, a sensor system for warning against elevated $CO_2$ levels is particularly relevant if the vehicle comprises batteries in addition to a fuel cell system, and the vehicle is configured for charging the batteries by power from the fuel cells also during a turned-off and parked situation.

Therefore, prior to installing such sensor system in the fuel-cell driven vehicle, it is advantageous to determine first whether the vehicle comprises a fuel cell system that produces substantial amounts of $CO_2$ during power production. In some cases, a sensor system for warning against elevated $CO_2$ levels is only necessary to be mounted onto or into the vehicle if this is the case.

In particularly, it may be of interest to determine, prior to mounting the sensor system, whether the vehicle comprises a fuel cell system as well as batteries and, in particular, whether the vehicle is configured for charging the batteries by power from the fuel cells also during a turned-off and parked situation. One may then decide to only mount the sensor system to the vehicle in the affirmative.

The fuel cell system of the vehicle comprises a fuel cell, typically a plurality of fuel cells, optionally a fuel cell stack. Herein, the term fuel cell is used for a single fuel cell as well as for multiple fuel cells, typically a fuel cell stack. The fuel cell comprises an anode side and a cathode side and a proton exchange membrane therein between for transport of hydrogen ions from the anode side to the cathode side through the membrane during operation.

For example, the fuel cell is of the type that operates at a high temperature. The term "high temperature" is a commonly used and understood term in the technical field of fuel cells and refers to operation temperatures above 120° C. in contrast to low temperature fuel cells operating at lower temperatures, for example at 70° C. For example, the fuel cell operates in the temperature range of 120-200° C.

For example, the fuel cell in the fuel cell system is a high temperature polymer electrolyte membrane fuel cell, (HT-PEM), which operates above 120° C., differentiating HT-PEM fuel cell from low temperature PEM fuel cells, the latter operating at temperatures below 100° C., for example at 70° C. The normal operating temperature of HT-PEM fuel cells is the range of 120° C. to 200° C., for example in the range of 160-185° C. The polymer electrolyte membrane PEM in the HT-PEM fuel cell is mineral acid based, typically a polymer film, for example polybenzimidazole doped with phosphoric acid. HT-PEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, especially for automobile industry.

In practical embodiments, alcohol is used as part of the fuel for the fuel cell, for example a mix of methanol and water. In a heated reformer, the fuel is catalytically reacted into syngas for the fuel cell for providing the necessary hydrogen gas to the anode side of the fuel cell. For the catalytic reaction in the reformer, the provided liquid fuel is evaporated in an evaporator that is conduit-connected to the reformer. For heating the reformer to the proper catalytic conversion temperature, for example in the range of 220-280° C., a reformer burner is provided and in thermal contact with the reformer for transfer of heat to the catalyser inside the reformer. The reformer burner comprises a burner-chamber providing flue gas by burning anode waste gas or fuel or both. For example, the reformer burner provides flue gas at a temperature in the range of 320-600° C., is provided from a reformer burner. The reformer comprises a catalyser inside a reformer housing, which has reformer walls. For example, the flue gas from the reformer burner is passing along the reformer walls and heats them. In such embodiment, the burner-chamber is in fluid-flow communication with the reformer walls for flow of the flue gas from the burner-chamber to and along the reformer walls for transfer of heat from the flue gas to the reformer walls.

As source for oxygen gas in the fuel cell, air is typically used and provided to the cathode side. In this case, an air supply is provided for supplying air to the cathode side. Optionally, prior to entering the fuel cell, the air is heated by an air heating system for increasing the temperature of the air. The air provides the oxygen for the fuel cell. Other gases of the air merely flow through the system and are discarded again.

Typically, in fuel cell systems, coolant is glycol based. However, for automobiles in cold areas, glycol is not optimum for the start-up, why other liquids are preferred. Examples of such other liquids include synthetic oils.

Such fuel cell systems are commonly provided with one or more oxygen sensors which are used for controlling the operation of the fuel cell system. This implies that such sensor can be used for the purpose of also measuring the oxygen level in the environment, so that no further oxygen sensor needs being installed.

Some fuel cell systems have a dedicated startup burner. Such startup burner, as the name already indicates, is used during startup of the fuel cell system but not during steady state production of electricity by the fuel cell system. In such fuel cell systems, a typical location for such oxygen sensor is downstream of the startup burner for controlling proper startup burning conditions. However, once the fuel cell system is in a steady state for electricity production, the oxygen sensor is not necessarily in use. However, the oxygen sensor can then be used for measuring the oxygen level in the air that is drawn in. Accordingly, in some embodiments, the oxygen sensor of the fuel cell system is implemented for the alarm system as a sensor system to sense the oxygen level in the environment around the vehicle.

It is also possible to use other $O_2$ sensors of the fuel cell system for such measurements. For example, if such $O_2$ sensor is provided in the flow path upstream of the cathode side of the fuel cell, the measurement reflects the $O_2$ concentration in the air around the vehicle.

As a further alternative, an oxygen sensor is mounted to the intake of the fuel cell system, which is a simple technical solution in that the sucking functionality of the fuel cell system is already given and does not need additional components to be installed for a proper measurement of the $O_2$ level. Also, or alternatively, a $CO_2$ sensor can be installed at such location.

ASPECTS

In the following, as a summary, some interrelated aspects are presented that fulfill at least one of the above objective and which are optionally combined with further aspects from the description herein.

Aspect 1. A method of increasing safety for the surroundings of an electric vehicle with a fuel cell system, the method comprising
  providing a sensor system configured for warning against elevated $CO_2$ levels in the surroundings of the vehicle, the sensor system comprising at least one of a carbon dioxide, $CO_2$, sensor and an oxygen, $O_2$, sensor; the sensor system having a gas intake, the sensor system being configured for correspondingly measuring at least one of $CO_2$ and $O_2$ levels in gas from the gas intake;
  mounting the sensor system on the vehicle with the gas intake outside the vehicle's cabin in order for the gas intake to have access to the air in the environment around the vehicle;
  then, using the sensor system for evaluating at least one of the $CO_2$ concentration and the $O_2$ concentration in gas from the gas intake relatively to a threshold value and providing an alarm when the concentration surpasses a predetermined threshold level.

Aspect 2. A method according to aspect 1, wherein the method comprises arranging the gas intake of the sensor system at a height below 0.5 m from the ground.

Aspect 3. A method according to aspect 1 or 2, wherein the method comprises determining whether the vehicle comprises a fuel cell system that produces $CO_2$ during operation for power production, and only mounting the sensor system to the vehicle in the affirmative.

Aspect 4. A method according to aspect 3, wherein the method comprises determining prior to mounting the sensor system whether the vehicle comprises a fuel cell system as well as batteries and whether the vehicle is configured for charging the batteries by power from the fuel cell system also during a turned-off and parked situation, and only mounting the sensor to the vehicle in the affirmative.

Aspect 5. A method according to any preceding aspect, wherein the method comprises providing a remote device in wireless communication with the sensor system, the remote device being programmed to receive a wireless alarm signal from the sensor system and indicate this to a user of the remote device.

Aspect 6. A vehicle comprising a fuel cell system, wherein the fuel cell system is configured for producing carbon dioxide, $CO_2$, when in operation for electricity production, the vehicle further comprising a sensor system configured for warning against elevated $CO_2$ levels in the surroundings of the vehicle, the sensor system comprising at least one of a $CO_2$ sensor and an $O_2$ sensor; the sensor system having a gas intake outside the vehicle's cabin in order for the gas intake to have access to the atmosphere in the environment around the vehicle; wherein the sensor system is configured for measuring at least one of the $CO_2$ concentration and $O_2$ concentration in gas from the gas intake and for evaluating the concentration in gas from the gas intake relatively to a threshold value and providing an alarm when the concentration surpasses a predetermined threshold level.

Aspect 7. A vehicle according to aspect 6, wherein the gas intake of the sensor system is arranged at a height below 0.5 m from the ground.

Aspect 8. A vehicle according to aspect 7, wherein the vehicle comprises a fuel cell system as well as batteries and wherein the vehicle is configured for charging the batteries by power from the fuel cell system also during a turned-off and parked situation.

Aspect 9. A vehicle according to anyone of the aspects 6-8, wherein the vehicle comprises high temperature polymer electrolyte membrane HT-PEM fuel cells as part of the fuel cell system, the fuel cells configured for operating at a temperature in the range of 120-200° C., and wherein the vehicle is configured for providing evaporated fuel to the fuel cells, wherein the fuel is a mix of alcohol and water.

Aspect 10. Use of a sensor system on a fuel-cell driven vehicle for increasing safety against increased $CO_2$ exposure in the surroundings of the vehicle, the sensor system comprising at least one of a $CO_2$ sensor and an $O_2$ sensor for correspondingly measuring at least one of the $CO_2$ concentration and $O_2$ concentration, wherein the sensor system comprises an alarm function for the event that $CO_2$ or $O_2$ concentrations are measured that pass a predetermined threshold level.

DESCRIPTION OF THE DRAWING

Embodiments of the invention will be described in the figures, wherein.

DETAILED DESCRIPTION OF THE INVENTION

Figure 1:
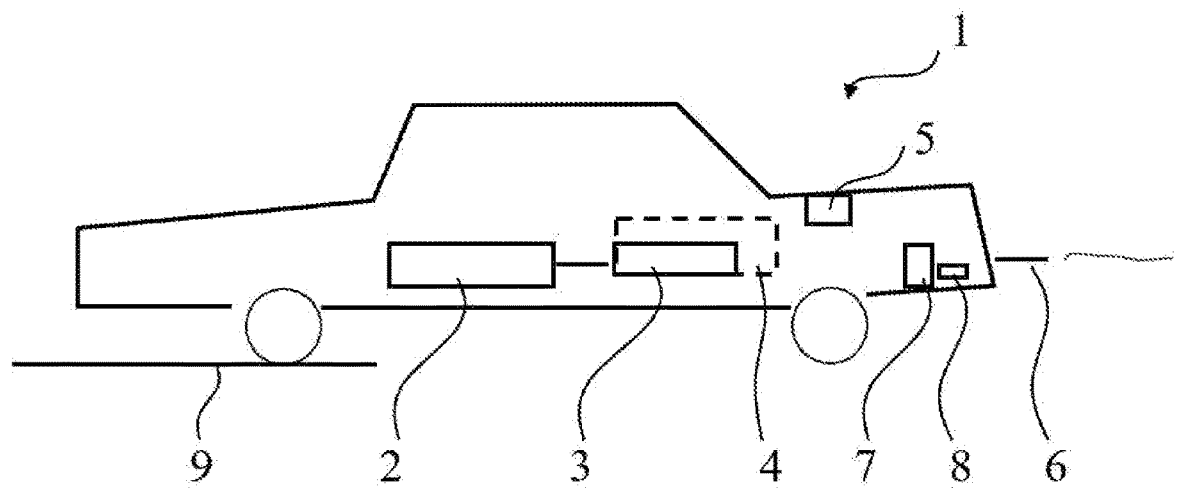
FIG. 1 a vehicle with a $CO_2$ sensor
  FIG. 2 a sensor in greater detail.

FIG. 1 illustrates vehicle 1 containing a fuel cell 3 typically multiple fuel cells, for example as a stack of fuel cells, and batteries 2, which are electrically interconnected with the fuel cell in order for the fuel cell 3 to charge the batteries 2 during driving, in which the fuel cell 3 and the batteries 2 have a role as a hybrid power supply system.

However, optionally, the batteries 2 can also be charged by the electrical power produced by the fuel cell 3 during parking in order to have fully charged batteries 2 at the next starting of the vehicle 1.

Advantageously, the fuel cell 3 is a high temperature polymer electrolyte membrane (HT-PEM) fuel cell. Typically, high temperature fuel cells operate in the temperature range of 120-200° C., and thus are producing heat as well. For example, the fuel cell 3 operates at a temperature of 170-185° C. This operation temperature is held constant by a correspondingly adjusted flow of coolant in a cooling circuit through the fuel cell. For example, the temperature of the coolant at the coolant inlet of the fuel cell is in the range of 160° C. to 175° C.

Apart from the fuel cells 3, the fuel cell system 4 comprises a combination of a reformer and corresponding reformer burner, and a temperature regulation system, including the cooling circuit. In addition, a power management system is provided. Fuel is provided from a fuel tank 5. For example, the fuel tank 5 contains alcohol, optionally methanol, to which water is added prior to catalytic transformation in a reformer for providing it as hydrogen fuel to the fuel cell.

As an example, in the reformer, the mix of methanol $CH_3OH$ and water $H_2O$ is catalytically converted into hydrogen gas $H_2$ and $CO_2$. The mix of $H_2$ and $CO_2$ is then supplied as so-called syngas to the anode side of the fuel cell 3, typically fuel cell stack.

Air from the environment is sucked in and supplied at increased pressure, typically by using a compressor, to the cathode side of the fuel cell 3 in order to provide the necessary oxygen for the reaction with the hydrogen to produce water, after hydrogen ions H+ have passed the membrane from the anode side to the cathode side.

Optionally, an oxygen sensor is provided in the flow path of the air prior to entering the cathode side of the fuel cell system.

The $CO_2$ from the catalysed fuel is passing through the fuel cell 3 and exits the system through the exhaust 6 of the vehicle 1. In a closed environment, this $CO_2$ can cause danger for humans and animals inside the closed space, as it displaces the necessary oxygen.

As a safety measure, a sensor 7 is provided in a sensor system, which has an intake 8 that is provided in flow-connection with the surroundings for intake of air from the environment. Optionally, in order to provide a high degree of safety, the intake 8 is provided near the ground 9, for example closer than 0.7 to the ground or even closer than 0.5 cm to the ground 9.

Figure 2:
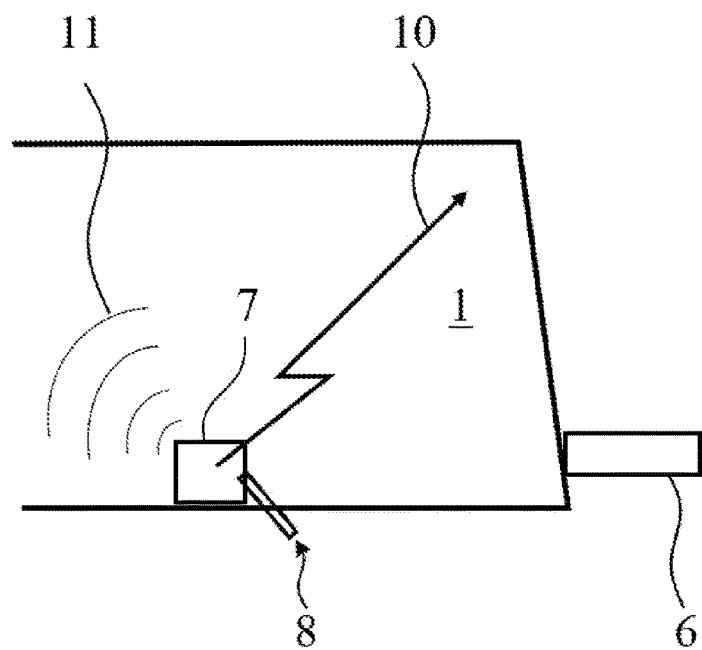

As an example, a sensor 7 is provided, as illustrated in FIG. 2, which shows the back part of the vehicle 1 in greater detail.

If the $CO_2$ level rises above a predetermined $CO_2$ threshold and/or if the oxygen level decreases below a predetermined $O_2$ threshold, an alarm is given, for example in the form of sound 11. Additionally or alternatively, a wireless signal 10 is sent, for example to a further alarm station and/or to a remote device, such as a mobile phone, in order for precautionary measures to be taken.

As mentioned above, the sensor system optionally uses an oxygen sensor of the fuel cell system so that no dedicated additional $O_2$ sensor has to be installed. Instead, the output signal from the $O_2$ sensor of the fuel cell system is branched into a control function which is programmed to cause an alarm in case of the measured $O_2$ concentration in the air that is drawn in is falling below a predetermined $O_2$ threshold level.

REFERENCE NUMBERS

1 vehicle
2 battery
3 fuel cell
4 fuel cell system
5 tank
6 exhaust of vehicle
7 sensor
8 intake of sensor
9 ground
10 wireless alarm signal
11 audio alarm

The invention claimed is:

1. A method of increasing safety in an environment surrounding an electric vehicle comprising and being electrically driven by a hybrid electrical power system comprising a fuel cell system as well as batteries, wherein the vehicle is configured for charging the batteries by power from the fuel cell system also during a turned-off and parked situation, wherein the fuel cell system is configured for producing carbon dioxide, $CO_2$, when in operation for electricity production, the method comprising providing a sensor system configured for warning against elevated $CO_2$, levels in the environment surrounding the vehicle, the sensor system comprising at least one of a carbon dioxide, $CO_2$, sensor and an oxygen, $O_2$, sensor; the sensor system having a gas intake, the sensor system being configured for correspondingly measuring at least one of $CO_2$ and $O_2$ levels in gas from the gas intake;

mounting the sensor system on the vehicle with the gas intake outside the vehicle's cabin in order for the gas intake to have access to the air in the environment around the vehicle;

then, by the sensor system evaluating at least one of the $CO_2$, concentration and the $O_2$ concentration in gas from the gas intake relatively to a threshold value and warning against elevated $CO_2$, levels in the environment surrounding the vehicle by providing an alarm when the concentration surpasses a predetermined threshold level for the environment surrounding the vehicle.

2. The method according to claim 1, wherein the method comprises arranging the gas intake of the sensor system at a height below 0.5 m from the ground.

3. The method according to claim 1, wherein the method comprises providing a remote device in wireless communication with the sensor system, the remote device being programmed to receive a wireless alarm signal from the sensor system and indicate this to a user of the remote device.

4. The method according to claim 1, wherein the sensor system comprises a $CO_2$, sensor.

5. An electric vehicle comprising a hybrid electrical power system comprising a fuel cell system as well as batteries for driving the vehicle by their electrical power, wherein the vehicle is configured for charging the batteries by power from the fuel cell system also during a turned-off and parked situation, wherein the fuel cell system is configured for producing carbon dioxide, $CO_2$, when in operation for electricity production, the vehicle further comprising a sensor system configured for warning against elevated $CO_2$, levels in the environment surrounding the vehicle when the vehicle is in the parked situation and the fuel cell system is producing electricity for charging the batteries, the sensor system comprising at least one of a $CO_2$, sensor and an $O_2$ sensor; the sensor system having a gas intake outside the vehicle's cabin in order for the gas intake to have access to the atmosphere in the environment around the vehicle; wherein the sensor system is configured for measuring at least one of the $CO_2$, concentration and $O_2$ concentration in gas from the gas intake and for evaluating the concentration in gas from the gas intake relatively to a threshold value for the surrounding environment and for warning against elevated $CO_2$, levels in the environment surrounding the vehicle by providing an alarm when the concentration surpasses a predetermined threshold level.

6. The vehicle according to claim 5, wherein the gas intake of the sensor system is arranged at a height below 0.5 m from the ground.

7. The vehicle according to claim 5, wherein the vehicle comprises high temperature polymer electrolyte membrane HT-PEM fuel cells as part of the fuel cell system, the fuel cells configured for operating at a temperature in the range of 120-200° C., and wherein the vehicle is configured for providing evaporated fuel to the fuel cells, wherein the fuel is a mix of alcohol and water.

8. The vehicle according to claim 5, wherein the sensor system comprises a $CO_2$, sensor.

* * * * *